United States Patent
Subban et al.

(10) Patent No.: US 10,662,082 B2
(45) Date of Patent: May 26, 2020

(54) DEVICES AND METHODS FOR REMOVING DISSOLVED IONS FROM WATER USING COMPOSITE RESIN ELECTRODES

(71) Applicant: THE REGENTS OF THE UNIVERSITY OF CALIFORNIA, Oakland, CA (US)

(72) Inventors: Chinmayee V. Subban, Hayward, CA (US); Ashok J. Gadgil, El Cerrito, CA (US); Robert Kostecki, Lafayette, CA (US); Guoying Chen, Oakland, CA (US)

(73) Assignee: The Regents of The University of California, Oakland, CA (US)

( * ) Notice: Subject to any disclaimer, the term of this patent is extended or adjusted under 35 U.S.C. 154(b) by 231 days.

(21) Appl. No.: 15/843,712

(22) Filed: Dec. 15, 2017

(65) Prior Publication Data

US 2018/0105441 A1    Apr. 19, 2018

Related U.S. Application Data (63) Continuation-in-part of application No. 15/515,999, filed as application No. PCT/US2015/054093 on Oct. 5, 2015.

(Continued)

(51) Int. Cl.
*C02F 1/46*    (2006.01)
*C02F 1/42*    (2006.01)
(Continued)

(52) U.S. Cl.
CPC .............. *C02F 1/42* (2013.01); *C02F 1/4604* (2013.01); *C02F 1/4691* (2013.01); *C02F 1/46109* (2013.01); *C02F 2001/46138* (2013.01); *C02F 2001/46157* (2013.01); *C02F 2101/103* (2013.01); *C02F 2101/14* (2013.01);
(Continued)

(58) Field of Classification Search
CPC ........ C02F 1/42; C02F 1/4691; C02F 1/4604; C02F 2001/46157; C02F 2103/08; C02F 2103/06; C02F 2101/14; C02F 2101/103; C02F 2303/16; C02F 2001/46138; C02F 1/46109; C02F 2201/4613; C02F 2103/32; C02F 2103/10; Y02W 10/37
See application file for complete search history.

(56) References Cited

U.S. PATENT DOCUMENTS 5,362,417 A   11/1994   Ziolo
5,804,057 A    9/1998   Zhou et al.
(Continued)

FOREIGN PATENT DOCUMENTS

EP    2708514    3/2014

OTHER PUBLICATIONS

International Search Report and Written Opinion for PCT Application No. PCT/US2015/054093, filed Oct. 5, 2015, 10 pages.
(Continued)

*Primary Examiner* — Arun S Phasge
(74) *Attorney, Agent, or Firm* — Womble Bond DIckinson (US) LLP; Daniel E. Ovanezian (57) ABSTRACT

The present disclosure provides a device comprising or configured to comprise composite resin electrodes. Further provided are methods of using the device for selectively removing dissolved ions from water.

35 Claims, 6 Drawing Sheets

Related U.S. Application Data (60) Provisional application No. 62/059,777, filed on Oct. 3, 2014.

(51) Int. Cl.
*C02F 1/469* (2006.01)
*C02F 1/461* (2006.01)
*C02F 101/10* (2006.01)
*C02F 101/14* (2006.01)
*C02F 103/06* (2006.01)
*C02F 103/08* (2006.01)
*C02F 103/32* (2006.01)
*C02F 103/10* (2006.01)

(52) U.S. Cl.
CPC ...... *C02F 2103/06* (2013.01); *C02F 2103/08* (2013.01); *C02F 2103/10* (2013.01); *C02F 2103/32* (2013.01); *C02F 2201/4613* (2013.01); *C02F 2303/16* (2013.01); *Y02W 10/37* (2015.05)

(56) References Cited

U.S. PATENT DOCUMENTS 6,143,163 A * 11/2000 Sawamoto ............ C02F 1/4618
205/742
2010/0147704 A1   6/2010 Xiong et al.
2017/0247268 A1   8/2017 Subban et al.

OTHER PUBLICATIONS

International Search Report and Written Opinion for PCT Application No. PCT/US2018/062472, dated Jan. 30, 2019, 12 pages.

* cited by examiner

DEVICES AND METHODS FOR REMOVING DISSOLVED IONS FROM WATER USING COMPOSITE RESIN ELECTRODES

RELATED PATENT APPLICATIONS

This application is a continuation-in-part of U.S. application Ser. No. 15/515,999, which is the National Stage of International Application No. PCT/US15/54093, filed Oct. 5, 2015, which claims priority to U.S. Provisional Patent Application Ser. No. 62/059,777, filed Oct. 3, 2014; and each of which is incorporated by reference in its entirety herein.

STATEMENT OF GOVERNMENTAL SUPPORT

This invention was made with government support under Contract No. DE-AC02-05CH11231 awarded by the United States Department of Energy. The government has certain rights in the invention.

FIELD OF THE INVENTION

This invention relates generally to selectively removing dissolved ions from water.

BACKGROUND OF THE INVENTION

In many areas of the world, surface water is unavailable for much of the year, and ground water has high concentrations of dissolved ions. WHO recommends total dissolved solids (TDS) which consist of dissolved salts and silica in drinking water to be not more than 500 ppm, however in many parts of the world, the population has no recourse but to drink groundwater with TDS concentrations as high as 800 ppm, 1000 ppm, and even in some cases 3000 ppm.

Methods to reduce ionic concentrations to more palatable levels include distillation, solar distillation, reverse osmosis, and ion exchange. In many cases these are not considered affordable, practical, or effective (e.g., owing to lack of adequate capital, land surface, solar insolation, or energy access). For years, membranes and ion exchange have been used to lower TDS from water and wastewater. These methods are not economical, practical or efficient for drinking water treatment, as they require high capital investment, substantive maintenance, large scale engineering, and energy inputs, and/or require use of toxic and corrosive chemicals.

The basic concept for separating compounds that are dissolved in water using electrical mean is quite old—dating to 1950. The technology began to be refined starting in 1990. Capacitive Deionization (CDI) is a process that applies a direct current electrical bias across a pair of electrodes immersed in the aqueous electrolyte to separate positively charged cations and negatively charged anions via migration and physical adsorption at the electrodes. For instance, in saline waters the positively charged sodium migrates to the negative electrodes and the negatively charged chloride ion migrates to the positive electrode.

The Electronic Water Purifier (EWP) is a new technology developed in the last 10 years that has low operating costs, low rejection wastewater volume, low capital expenditure, no chemical requirements, a small footprint and is now available in sizes ranging from under-the-sink water purifiers to large commercial units. EWP uses a CDI process to remove dissolved ions from water and utilizes a semipermeable, ion-specific membrane to increase salt capture efficiency of the electrodes. The device consists of multiple layers including current collectors, conductive high surface area electrodes, and an ion-specific membrane. An electrically non-conductive spacer material separates the plates from one another, while allowing a flow of water between the electrodes, parallel to the electrode surfaces.

In common practice, these electrodes are alternately connected to the two sides of a DC power supply. The device works on the principle of capacitive deionization to purify water, with the application of a low voltage DC potential to attract and discharge ions to the electrode surface. The high-surface-area carbon electrode layers attract and hold ions on their surface removing them from the water stream flowing through the inter-electrode gaps. After some time interval of such operation, all the charged sites are filled, and the device must then be regenerated by discharging the ions from the electrode surfaces. This is accomplished by shorting the electrodes or reversing the polarity of the applied DC potential. Once a substantial number of the newly displaced ions are flushed in the waste stream, after a length of time, the unit begins to charge again by attracting ions from the feed solution under the influence of the reverse potential.

To prevent ions just crossing over to the other electrode when the voltage is reversed sometimes called the ping-pong effect), it is customary to add an ion-selective membrane on top of each electrode. The membranes increase cost, add risk of fouling, but improve short term performance.

However, this method is still limited by a relatively slow mass transfer across the electrolyte and inadequate ion storage capacity and relatively high operation cost. Currently, there are no inexpensive, energy-efficient and water-efficient methods to reduce ionic salts appearing as total dissolved solids (TDS) in water sources.

Treatment of low-TDS water sources has wide ranging applications and includes municipal, agricultural, and industrial sectors among others.

Most of the CDI devices thus far available commercially use carbonaceous electrodes. Activated carbons, carbon aerogels, and carbon nanotubes offer high surface active area and relatively large ion storage capacity. However, such electrodes are often brittle and difficult to handle, their dense nanoporous structure is hardly accessible to solutions which impedes rapid mass transfer, and some of these nanoengineered materials are prohibitively expensive. The high surface areas of these materials is also prone to fouling and degradation. Additionally, expensive ion-selective membranes used in all commercial CDI devices add cost and maintenance challenges.

SUMMARY OF THE INVENTION

The present invention provides for a device useful for removing dissolved ions from water. The device comprises or is configured to comprise composite resin electrodes. The present invention also provides for a method for removing dissolved ions from water, comprising providing said device, and using it thereof.

The present invention provides for a system for removing dissolved ions from water, comprising: (a) at least one first electrode in contact with a first plurality of ion exchange resin (IER) particles, (b) at least one second electrode in contact with a second plurality of IER particles, (c) a voltage source, (d) a chamber containing or defined by the at least one first electrode and the at least one second electrode, (e) an inlet, (f) a first outlet, and (g) optionally a second outlet, wherein the at least one first electrode, the at least one second electrode, and the electricity source are in electrical communication with each other, and the chamber is in fluid communication with the inlet, the first outlet, and optionally the second outlet, and optionally the voltage source is configured so that the direction of a current to the at least one first electrode and the at least one second electrode can be switched.

The present invention also provides for a system for removing dissolved ions from water, comprising: (a) an inlet, (b) at least one first electrode in contact with a first plurality of ion exchange resin (IER) particles, (c) an electrically insulating, water-permeable separator, (d) at least one second electrode in contact with a second plurality of IER particles, (e) an outlet, and (f) a DC or AC voltage source, wherein (i) the insulating separator separates the at least one first electrode and the at least one second electrode, (ii) the at least one first electrode, the at least one second electrode, and the electricity source are in electrical communication with each other, and (iii) there is fluid communication in the following order: the inlet, the region between the at least one first and the at least one second electrodes including the insulating separator, and the outlet, and (iv) optionally the voltage source is configured so that the direction of a current to the at least one first electrode and the at least one second electrode can be switched. In some embodiments, the first plurality of IER particles comprises cation exchange resin (CER). In some embodiments, the second plurality of IER particles comprises anion exchange resin (AER). In some embodiments, the IER particles are spherical having an average diameter that of about 5 nm to about 0.5 mm. In some embodiments, the electrodes comprise one or more metal meshes wherein the IER particles are packed into metal meshes. In some embodiments, the at least one first and at least one second electrode comprises two or more than two of each first and second electrode. In some embodiments, a plurality of first and second electrodes is provided.

During operation, a device or apparatus comprising the system has two steps: a desalinating step and a regenerating step. During the desalinating step, ion-containing water flows into the system and the cations in the ion-containing water associate with the CER, and the anions in the ion-containing water associate with the AER. Water flowing out of the outlet is relatively deionized water, and has fewer ions than the ion-containing water flowing into the inlet. The AER and CER are capable of trapping charges (chemically) without any applied voltage. During the regenerating step, the saturated CER and AER (or spent CER and AER) are regenerated by applying a voltage to the electrodes. In this system, the IER particles are made electrically conducting, and do not need to be part of a "composite" electrode. In this system, a voltage does not need to be applied for the desalinating step, and a voltage only needs to be applied for the regenerating step.

In some embodiments, at least part or all of the IER particles of the first and/or second pluralities of IER particles are particles produced by the ball milling of IER beads. In some embodiments, at least part of all of the IER particles of the first and/or second pluralities of IER particles comprise a surface that is conducting. In some embodiments, the conducting surface is made by pyrolyzing the bead surface. In some embodiments, the surface of an IER bead has a conductive and ion-porous surface coating made from a second material. In some embodiments, the IER particles or IER beads have an average surface area of equal to or more than 0.1 $m^2/g$, 1 $m^2/g$, 10 $m^2/g$, 1,000 $m^2/g$, 2,500 $m^2/g$, 5,000 $m^2/g$, 7,500 $m^2/g$, 10,000 $m^2/g$, or 12,500 $m^2/g$, or within any range of one thereof to equal to or less than 15,000 $m^2/g$.

In some embodiments, the at least one first electrode is the cathode, and at least part or all of the IER particles of the first plurality of IER particles are cation exchange resin (CER). In some embodiments, the at least one second electrode is the anode, and at least part or all of the IER particles of the second plurality of IER particles are anion exchange resin (AER). In some embodiments, the at least one first electrode and/or the at least one second electrode comprise a conductive matrix, wherein the IER particles are embedded on the surface of, held in place by, or both, by the conductive matrix. In some embodiments, the at least one first electrode and/or the at least one second electrode comprise one or a plurality of conductive matrices that support a plurality of layers of IER particles.

Figure 1A:
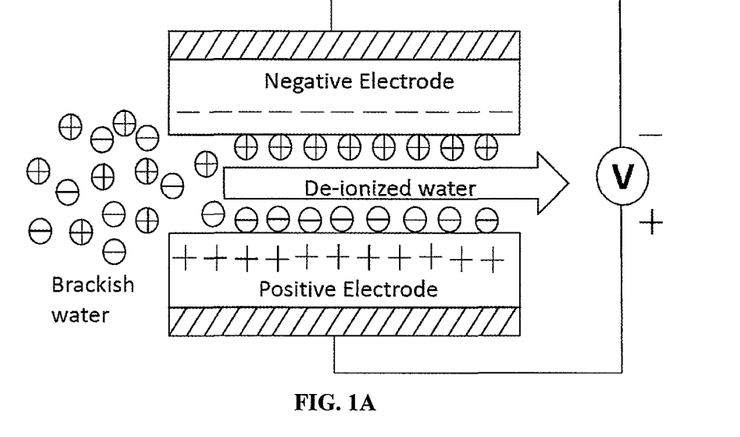
FIG. 1A is a schematic of a CDI apparatus. Brackish water flows between two electrodes held at a constant voltage difference. The ions in the influx are drawn to and held at oppositely charged electrode surfaces. The layer of charge inside the electrode and the layer of oppositely charged ions outside the electrode constitute the "electric double layer." Once the electrode surface area is saturated with ions, the flow is stopped and voltage reversed, so the ions re-enter the solution. This highly concentrated solution is passed to a waste stream, and the process repeats.
Figure 1B:
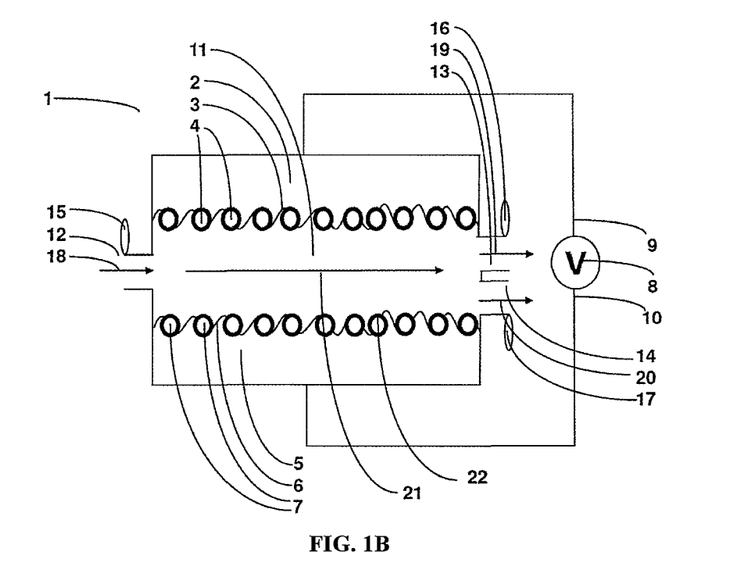
FIG. 1B is a schematic illustration of an exemplary embodiment of the apparatus of the present disclosure.

In some embodiments, as shown in FIG. 1B, the system comprises a device or apparatus 1 comprising: (a) at least one first electrode 2 comprising a first surface 3 in contact with a first plurality of IER particles 4, (b) at least one second electrode 5 comprising a second surface 6 in contact with a second plurality of IER particles 7, (c) an voltage source 8 in electrical communication with the at least one electrode 2 via a first electrical contact 9, and with the at least one second electrode 5 via a second electrical contact 10, (d) a chamber 11 defined by the at least one first electrode 2 and the at least one second electrode 5, (e) an inlet 12, (f) a first outlet 13, (g) a second outlet 14, (h) optionally a means 15 for sealing the inlet 12, (i) optionally a means 16 for sealing the first outlet 13, and (j) optionally a means 17 for sealing the second outlet 14. In some embodiments, the first outlet 13 and the second outlet 14 are the same. Arrow 18 defines the direction of flow of ion-containing water into the chamber 11 via inlet 12. Arrow 19 defines the direction of flow of deionized water out of the chamber 11 via the first outlet 13. Arrow 18 defines the direction of flow of waste water out of the chamber 11 via the second outlet 14. Arrow 21 defines the direction of flow of ion-containing water out of the chamber 11. In some embodiments, the IER particle comprises a surface coated with carbon 22. In some embodiments, the first surface 3 and/or the second surface 5 are modified to increase the surface area of the first surface 3 and/or the second surface 5. In some embodiments, when the first outlet and the second outlet are the same, the system comprises a means to divert the flow from the first outlet to more than one direction. In some embodiments, the direction of electric field generated by the potential applied by the at least one first and/or at least one second electrodes is perpendicular to the direction of water flow. In some embodiments, the at least one first electrode 2 and/or the at least one second electrode 5 may be thin and flexible, and may be placed in a chamber made of a different robust, but passive material.

Figure 2:
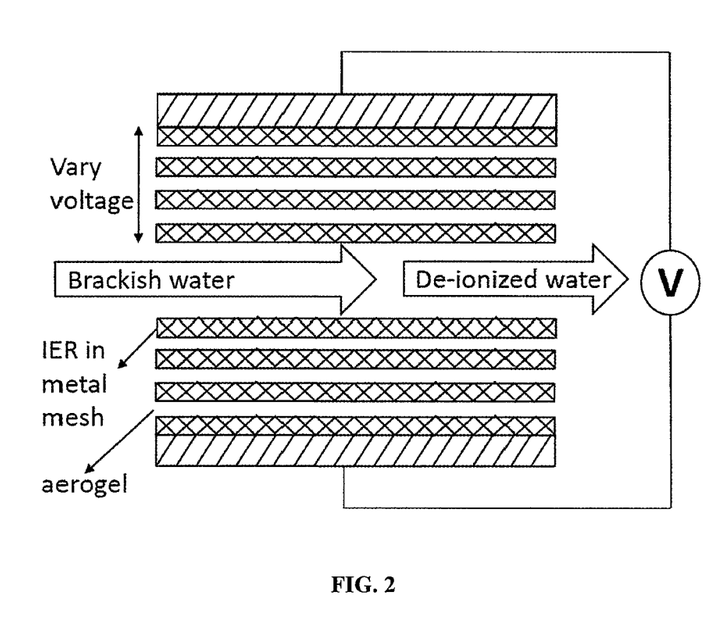
FIG. 2 is a schematic illustration of an exemplary embodiment of the apparatus of the present disclosure wherein the electrodes comprise multiple layers of electrodes and each layer comprises a layer, such as a monolayer, of IER particles.

In some embodiments, the at least one first electrode and/or the at least one second electrode comprise multiple layers of conductive matrix and each layer of matrix comprises a layer, such as a monolayer, of IER particles (see FIG. 2). Each layer is separated from the next, or adjacent, layer with an ion-permeable electrically insulating layer, such as an insulating porous spacer, or a layer of aerogel. Multiples of such layers make up the electrode. Each layer is provided with a different voltage so that a voltage gradient is established within each electrode, thereby resulting in a deeper penetration of ions in the electrode, and a larger capture capacity for ions before the need for regeneration.

The present invention provides for a method for removing dissolved ions from ion-containing water comprising: (a) providing the system or apparatus for removing dissolved ions from ion-containing water of the present invention; (b) flowing ion-containing water into the chamber via the inlet, (c) optionally running a direct or alternating current through the water via the at least one first electrode and the at least one second electrode, (d) continuously flowing ion-containing water from the inlet into the chamber and out of the first outlet, wherein, in the chamber, one or more cations in the ion-containing water associate to a IER particle of the first plurality of IER particles and one or more anions in the ion-containing water to associate to a IER particle of the second plurality of IER particles, such that relatively deionized water flows out of the chamber via the first outlet, (e) optionally stopping the flow of the ion-containing water of step (d), (f) running a direct current through the water in a direction reverse to the direct current of step (c) such that the cations dissociate from the IER particle of the first plurality of IER particles and the anions dissociate from the IER particle of the second plurality of IER particles to form waste water in the chamber, (g) flowing the waste water out of the chamber via the second outlet, and (h) optionally repeating steps (d) to (g).

The present invention provides for a method for removing dissolved ions from ion-containing water comprising: (a) providing the system or apparatus for removing dissolved ions from ion-containing water of the present invention; (b) flowing ion-water containing water into the system via the inlet, such that cations in the ion-water containing water associate with the CER, anions in the ion-water containing water associate with the AER, and water flowing out of the outlet has fewer ions than the ion-containing water flowing into the inlet, (c) regenerating the CER and AER comprising (i) flowing water containing fewer ions into the system via the inlet, optionally at a reduced flow rate relative to step (b), (ii) optionally, closing the outlet, and (iii) applying a voltage to the CER and AER, such that the cations disassociate from the CER and the anions disassociate from the AER, (d) opening the outlet to let the water containing the disassociated cation and anions in the system flow out, and (e) optionally repeating steps (b) to (e). In some embodiments, the water containing fewer ions of step (c) (i) is water obtained from step (b). In some embodiments, the outlet in step (c)ii remains open. In some embodiments, the outlet in step (c)ii is closed. In some embodiments, the flow rate of flowing water in step (c)i remains substantially unchanged relative to the flow rate in step b. In some embodiments, the flow rate of flowing water in step (c)i is reduced relative to the flow rate in step b.

In some embodiments, the ion removed is any cation having an atomic number equal to or larger than 3. In some embodiments, the cation is an element of Group 1 or 2, or any cation with a valence of +1 or +2. In some embodiments, the cation is, for example, one or more of $Li^+$, $Na^+$, $K^+$, $Be^{2+}$, $Mg^{2+}$, or $Ca^{2+}$. In some embodiments, the ion removed is any anion having an atomic number equal to or larger than 5. In some embodiments, the anion is an element of Group 16 or 17, or any anion with a valence of −1 or −2. In some embodiments, the anion is, for example, $F^-$, $Cl^-$, $Br^-$, $NO_3^{31}$, $SO_4^{2-}$, or $Se^{2-}$.

The present invention further provides a method of selectively removing at least a portion of dissolved ions from water containing a first concentration of ions to be removed. The method comprises (a) providing a system for selectively removing at least a portion of the dissolved ions to be removed from an ion-containing water, the system comprising at least one first electrode in contact with a first plurality of selective ion exchange resin (IER) particles, at least one second electrode in contact with a second plurality of IER particles, a direct or alternating current voltage source, a chamber defined by, or containing, the at least one first electrode and the at least one second electrode, an inlet, and a first outlet, wherein the at least one first electrode, the at least one second electrode, and the direct current voltage source are in electrical communication with each other and the chamber is in fluid communication with the inlet and the first outlet, wherein the direct current voltage source is configured so that the direction of a current to the at least one first electrode and the at least one second electrode can be switched, and wherein the first and second plurality of IER particles independently have selectivity for one or more ions to be removed; (b) providing a flow of water containing the first concentration of ions, said flow moving from the inlet into the chamber and out of the first outlet, wherein, in the chamber, one or more dissolved ions to be removed associate to the first and/or second plurality of selective IER particles, wherein water containing a second concentration of one or more of said dissolved ions to be removed flows out of the chamber via the first outlet, and wherein said second concentration of ions is lower than said first concentration of ions; (c) passing a current through the water remaining in or passing through the chamber, such that the one or more ions associated with the first and/or second plurality of selective IER particles dissociate from said particles, thereby forming in the chamber a waste water in which said second concentration of ions is higher than said first concentration of ions; and (d) flowing the waste water out of the chamber.

In some embodiments, the method further comprises, in step (b), passing a direct current through the water in the chamber containing the first concentration of ions to be removed via the at least one first electrode and the at least one second electrode. In some embodiments, the at least one first electrode is negatively charged and the at least one second electrode is positively charged. In some embodiments, the current is applied at an absolute magnitude of voltage from about 0 to about 5 volts across the at least one first and at least one second electrodes. In some embodiments, the current in absolute magnitude is from about 10 $\mu A/cm^2$ to about 10 $mA/cm^2$.

In some embodiments, the method further comprises repeating steps (c) and (d) one or more times. In some embodiments of the method, the device further comprises a second outlet in fluid communication with the chamber, the inlet and the first outlet. In some embodiment, the waste water is flowed out of the second outlet. In some embodiments, the method further comprises reducing, increasing or stopping the flow of water of step (b) during step (c). In some embodiments, the current in step (c) is applied at a voltage from about 0.1 to about 5 volts. In some embodiments, the current in step (c) is from about 10 $\mu A/cm^2$ to about 10 $mA/cm^2$. In some embodiments, the current is applied for a time sufficient to dissociate from about 20% to about 95% of the ions associated with the selective IER. In some embodiments, the time is from about 1 second to about 2 hours. In some embodiments the time is from about 30 seconds to about 30 minutes. In some embodiments, the device provided within the method comprises a plurality of first and second electrodes, such as two, at least two, or at least two or more of each first and second electrode.

In some embodiment, the ions to be selectively removed are anions and/or cations comprising one or more elements from any one or more of Periodic Table Groups 1 to 17. In some embodiments, at least one of the anions or cations comprise an element of Group 1 or 2. In some embodiments, at least one of the anions or cations comprise one or more elements from any one or more of Groups 3-14. In some embodiments, at least one of the anions or cations comprise one or more elements selected from the group consisting of sodium, potassium, lithium, calcium, fluorine, chlorine, bromine, antimony, arsenic, bismuth, boron, cadmium, chromium, copper, gallium germanium, gold, indium, iridium, iron, lead, manganese, mercury, nickel, nitrogen, phosphorous, platinum, radium, rhodium, ruthenium, selenium, silver, sulfur, thallium, tin, uranium, and zinc. In some embodiments, the anions to be selectively removed are one or more of arsenate, fluoride, bromate, chloride, chromate, cyanide, nitrate, perchlorate, phosphate, selenate, or sulfate. In some embodiments, the cations to be selectively removed are one or more of lithium, sodium, potassium, or calcium.

In some embodiments, the first plurality of selective ion exchange resin particles and the second plurality of selective ion exchange resin particles are each independently selected from the group consisting of strongly acidic resins bearing sulfonic acid groups, strongly basic resins bearing quaternary amino groups, weakly acidic resins with carboxylic acid groups, weakly basic resins bearing primary, secondary, and/or tertiary amino groups, chelating resins bearing iminodiacetic acid groups, ion selective resins, gel-type resins and macroporous resins. In some embodiments, the first plurality of selective ion exchange resin particles and the second plurality of selective ion exchange resin particles are different.

In some embodiments, the at least one first and the at least one second electrodes comprise a conductive substrate. In some embodiments, the conductive substrate is one or more of a conductive metal, a conductive metal alloy, a conductive semi-metal, or a conductive polymer. In some embodiments, the conductive metal is stainless steel. In some embodiments, the conductive semi-metal is carbon. In some embodiments, the conductive polymer is a nylon composite plate, mesh or film.

In some embodiments, the ion-containing water contains ions in an amount from about 1 ppm to about 10,000 ppm. In some embodiments, the first concentration of ions to be removed is from about 1 ppm to about 10,000 ppm. In some embodiments, the second concentration of ions is from about 0.01 ppm to about 4,000 ppm.

In some embodiments, the ion-containing water contains dissolved ions comprising at least a first species of ion and a second species of ion, and selective removal of the first species of ion in the presence of the second species of ion occurs with a selectivity for the first species of ion from about 5 to about 200 fold. In some embodiments, the first species of ion is nitrate and the second species of ion is sulfate. In this embodiment, nitrate is selectively removed in the presence of sulfate.

In some embodiments, the method further comprises the step (e) of collecting the waste water for recovery of the dissociated ions. In some embodiments, the ion-containing water is provided from an agricultural, municipal, industrial, food and beverage, mining, construction, brackish groundwater aquifers, or other waste source.

BRIEF DESCRIPTION OF THE DRAWINGS

The foregoing aspects and others will be readily appreciated by the skilled artisan from the following description of illustrative embodiments when read in conjunction with the accompanying drawings.

DETAILED DESCRIPTION

Before the present invention is described, it is to be understood that this invention is not limited to particular embodiments described, as such may, of course, vary. It is also to be understood that the terminology used herein is for the purpose of describing particular embodiments only, and is not intended to be limiting, since the scope of the present invention will be limited only by the appended claims.

Where a range of values is provided, it is understood that each intervening value, to the tenth of the unit of the lower limit unless the context clearly dictates otherwise, between the upper and lower limits of that range is also specifically disclosed. Each smaller range between any stated value or intervening value in a stated range and any other stated or intervening value in that stated range is encompassed within the invention. The upper and lower limits of these smaller ranges may independently be included or excluded in the range, and each range where either, neither or both limits are included in the smaller ranges is also encompassed within the invention, subject to any specifically excluded limit in the stated range. Where the stated range includes one or both of the limits, ranges excluding either or both of those included limits are also included in the invention.

Unless defined otherwise, all technical and scientific terms used herein have the same meaning as commonly understood by one of ordinary skill in the art to which this invention belongs. Although any methods and materials similar or equivalent to those described herein can be used in the practice or testing of the present invention, the preferred methods and materials are now described. All publications mentioned herein are incorporated herein by reference to disclose and describe the methods and/or materials in connection with which the publications are cited.

It must be noted that as used herein and in the appended claims, the singular forms "a", "and", and "the" include plural referents unless the context clearly dictates otherwise. Thus, for example, reference to "an ion" includes a plurality of such ions, and so forth.

The term "about" refers to a value including 10% more than the stated value and 10% less than the stated value.

The term "particles" also encompasses "beads."

These and other objects, advantages, and features of the invention will become apparent to those persons skilled in the art upon reading the details of the invention as more fully described below.

In some embodiments, the system comprises the building of a series of hybrid CDI/ion (cation and anion) exchange composite electrodes for ion transport, capture and removal. The ion exchange process can be controlled and accelerated via voltage polarization. IERs may be impregnated or coated with a conductive medium, such as carbon black (i.e., soot), and these modified particles are used to form anode and cathode (using anion type and cation type resins) of the presently disclosed device. In some embodiments, an electric field is used to draw ions to these electrodes. In some embodiments, ions are drawn to the electrodes by diffuse transport. Once the ions reach the IER, they are captured with ion exchange occurring in the resin. As the electric field is relaxed or reversed, the IER is electrochemically regenerated without need for toxic and corrosive chemicals.

In some embodiments, the conducting medium could be impregnated into the IER either (a) during the synthesis or final physical processing of the IER itself, or (b) by reprocessing commercially available resins. Path A would require re-engineering the synthesis process. Path B requires developing a method of coating the resin particles with a layer of conductive coating that is both thin and/or porous enough to allow ions to reach the IER and thick enough to provide a continuous and low resistance path of electronic conductivity within the composite electrode.

One method of coating commercially available IER with thin layers of carbon would involve using a methane flame to generate soot. To achieve a uniform 3D coating a fluidized bed may be used. Coated beads could be attached to a wire mesh to facilitate conductivity and electrode integrity. The derived conductive layers may then be subject to further processing to control surface and chemical properties of the electrodes.

Another method uses plasma to pyrolyze the surface layer of the existing organic resin particles. The process would be tuned to create a thin layer of carbon without overheating and destroying the resin or its unique properties. In addition, one can try to reach the higher conducting $sp^2$ coordination state of carbon as opposed to hard carbons, which include non-conductive $sp^3$ and sp coordinated structures. A metal catalyst, such as Cu or Ni, may be deposited on the resin prior to pyrolysis to promote growth of carbon nanotubes and other high surface area carbon structures, increasing the ion removal capacity and also conductive properties.

Another approach involves making electrodes from multiple layers: each layer comprising a conducting fine wire mesh layered with a monolayer of IER beads/particles, separated from the next layer with a non-permeable insulating layer, which can be an insulating porous spacer (or a thin layer of aerogel). Multiple layers make up the electrode. Each wire mesh is given a different voltage so a voltage gradient within the electrode is established, allowing deeper penetration of ions in the electrode, and a larger capture capacity for ions before the need for regeneration.

In some embodiments, microfluidic channels can be used to aid the separation of concentrated ion solution from free-ion solution. A silica aerogel can be used as an insulator between the electrodes. The aerogel can fully occupy the space between the electrodes and suppress diffusive remixing of the separated ions. In another embodiment, a thin layer of silica aerogel coats the electrodes, leaving a small gap that forms a microfluidic channel between the electrodes. This avoids the high pressure gradient needed to push the water through the gel, while still suppressing remixing of ions. The thin layer of gel acts as a porous insulator only, allowing the ions to pass through to the electrode perpendicular to the direction of water flow (which would not be through the aerogel).

The present invention further provides a method of selectively removing at least a portion of dissolved ions from water containing a first concentration of ions to be removed. The method comprises: (a) providing a system for selectively removing at least a portion of the dissolved ions to be removed from an ion-containing water, the system comprising at least one first electrode in contact with a first plurality of selective ion exchange resin (IER) particles, at least one second electrode in contact with a second plurality of IER particles, a direct current voltage source, a chamber defined by or containing the at least one first electrode and the at least one second electrode, an inlet, and a first outlet, wherein the at least one first electrode, the at least one second electrode, and the direct current voltage source are in electrical communication with each other and the chamber is in fluid communication with the inlet and the first outlet, wherein the direct current voltage source is configured so that the direction of a current to the at least one first electrode and the at least one second electrode can be switched; and wherein the first and second plurality of IER particles independently have selectivity for one or more ions to be removed; (b) providing a flow of water containing the first concentration of ions, said flow moving from the inlet into the chamber and out of the first outlet, wherein, in the chamber, one or more dissolved ions to be removed associate to the first and/or second plurality of selective IER particles, whereby water containing a second concentration of one or more of said dissolved ions to be removed flows out of the chamber via the first outlet, and wherein said second concentration of ions is lower than said first concentration of ions; (c) passing a direct current through the water remaining in or flowing through the chamber, such that the one or more ions associated with the first and/or second plurality of selective IER particles dissociate from said particles, thereby forming in the chamber a waste water in which said second concentration of ions is higher than said first concentration of ions; and (d) flowing the waste water out of the chamber.

In some embodiments, the method further comprises, in step (b), passing a direct current through the water in the chamber containing the first concentration of ions to be removed via the at least one first electrode and the at least one second electrode. Without wishing to be bound by theory, it is believed that in at least certain circumstances, application of current may increase efficiency of ion association with resin. In some embodiments, the at least one first electrode is negatively charged and the at least one second electrode is positively charged. In other embodiments, the at least one first electrode is positively charged and the at least one second electrode is negatively charged. In some embodiments, no current is applied, and no charge exists. In some embodiments, the current is applied at a voltage in absolute magnitude from about 0 to about 5 volts. In some embodiments, the current is in absolute magnitude from about 10 $\mu A/cm^2$ to about 10 $mA/cm^2$. In some embodiments, the at least one first and at least one second electrodes comprise a conductive substrate. The conductive substrate can be, for example, one or more of a conductive metal, a conductive metal alloy, a conductive semi-metal, or a conductive polymer. A non-limiting example of a conductive metal is stainless steel. A non-limiting example of a conductive semi-metal is carbon. Carbon may be utilized in many forms (e.g., graphite, powder, embedded in polymer, etc.), and may be of various surface areas, porosities, particle sizes, and chemical and physical properties. A non-limiting example of a conductive polymer is a nylon composite, which may be in multiple forms. Non-limiting examples include plate, mesh or film forms. In some embodiments, the device provided within the method comprises a plurality of first and second electrodes, such as two, at least two, or at least two or more of each first and second electrode. One of skill in the art will recognize that the number of first and second electrodes may be varied based on design constraints, capacity and the like.

In some embodiments, the ions to be selectively removed are anions and/or cations comprising one or more elements from any one or more of Periodic Table Groups 1 to 17. By anion is meant an ionic species bearing a negative charge. By cation is meant an ionic species bearing a positive charge. In some embodiments, at least one of the anions or cations comprise an element of Group 1 or 2. The cation may be the ion produced by loss of one or more valence electrons of the corresponding element. Non-limiting examples include lithium (as $Li^{+1}$), sodium (as $Na^{+1}$), or calcium (as $Ca^{+2}$) and the like. Typically, such anions and cations will be present from dissolution of a salt in the water. A non-limiting example is the presence of sodium chloride, which, dissolved in water, provides sodium ions (cation) and chloride ions (anion). In some embodiments, at least one of the anions or cations comprise one or more elements from any one or more of Groups 3-14. In some embodiments, at least one of the anions or cations comprise one or more elements selected from the group consisting of sodium, potassium, lithium, calcium, fluorine, chlorine, bromine, antimony, arsenic, bismuth, boron, cadmium, chromium, copper, gallium, germanium, gold, indium, iridium, iron, lead, manganese, mercury, nickel, nitrogen, phosphorous, platinum, radium, rhodium, ruthenium, selenium, silver, sulfur, thallium, tin, uranium, and zinc. One skilled in the art will recognize the manner in which elements such as these may produce corresponding anions and cations. For example, boron may be combined with oxygen, and therefore be present as the borate anion ($BO_3^{-3}$). Similarly, nitrogen, chlorine, phosphorus and sulfur, for example, may be combined with oxygen and present as nitrate, perchlorate, phosphate, and sulfate, respectively. In some embodiments, the anion to be selectively removed is one or more of arsenate, fluoride, bromate, chloride, chromate, cyanide, nitrate, perchlorate, phosphate, selenate, or sulfate. In some embodiments, the ion to be removed is a cation. In some embodiments, the cation to be selectively removed is one or more of lithium, sodium, potassium, or calcium. It will be recognized that the ions referred to may be present in various combinations simultaneously or individually, and may be present in various amounts.

The presently disclosed method is useful in removing, individually or multiply, various ions which may be present in varied concentrations. In some embodiments, the ion-containing water may contain an initial concentration of one or more ions to be removed in an amount from about 1 ppm to about 10,000 ppm. In some embodiments, the water subjected to the selective ion removal of the present disclosed method has, after step (b), a second concentration of ions. This second concentration is generally less than the first concentration, and for example, may be from about 0.01 ppm to about 4,000 ppm. The first and second concentrations of ions present may be determined by techniques know to those skilled in the art. These may be standard quantitative analytical techniques, or, conveniently, conductivity may be used as a surrogate measure of ion content of the influent and effluent waters provided according to the present method. In some embodiments, multiple ion species may be present, and the present method contemplates preferentially removing one or more of these species. Therefore, the method provides selective or even specific removal of ions. In some embodiments, the selectivity for removal of a first species of ion in the presence of a second species of ion is from about 5 to about 200 fold. In some embodiments, nitrate is selectively removed in the presence of sulfate.

In some embodiments, the first plurality of selective ion exchange resin particles and the second plurality of selective ion exchange resin particles are each independently selected from the group consisting of strongly acidic resins bearing sulfonic acid groups, strongly basic resins bearing quaternary amino groups, weakly acidic resins with carboxylic acid groups, weakly basic resins bearing primary, secondary, and/or tertiary amino groups, chelating resins bearing iminodiacetic acid groups, ion selective resins, gel-type resins and macroporous resins. In some embodiments, the first plurality of selective ion exchange resin particles and the second plurality of selective ion exchange resin particles are different. Such resins are known to those skilled in the art and are commercially available. Resins may be used in the present devices as obtained, or may be subject to further processing steps according to the specific application intended.

Periodically, the resins of the present method will become saturated with the associated ions and present a diminished capacity to further remove ions from the water. At this point, the resin may be recharged by dissociating the previously associated ions. In the present method, this is accomplished through application of a voltage across the electrodes. Without wishing to be bound by theory, it is believed that application of this current may both promote dissociation of ions by charge repulsion as well as by local generation of acidic and basic species which displace the ions occupying the resin. The voltage and current necessary to achieve regeneration and the period of time necessary to achieve regeneration may be interdependent, and may also depend on the design of the device (size, surface areas, capacity, flow rates, etc.). In some embodiments, the current is applied at an absolute magnitude voltage of from about 0.1 to about 5 volts. In some embodiments, the current applied is at an absolute magnitude of from about 10 $\mu A/cm^2$ to about 10 $mA/cm^2$. In some embodiments, the current is applied for a time sufficient to dissociate from about 20% to about 95% of the associated ions. In some embodiments, the time required is from about 1 second to about 2 hours. In some embodiments, the time required is from about 30 seconds to about 30 minutes. In some embodiments, the method further comprises repeating steps (c) and (d) one or more times. One skilled in the art will recognize that disassociating and removing associated ions to provide a resin with a renewed capacity to associate ions may be achieved under various configurations and conditions of flow according to the design and intended use of the method and corresponding system. In some embodiments, the device provided further comprises a second outlet in fluid communication with the chamber, the inlet and the first outlet. In some embodiments, the waste water is flowed out of the second outlet. In some embodiments, the flow of water of step (b) during step is reduced, increased, stopped or diverted during step (c).

In some embodiments, the ion-containing water is provided from an agricultural, municipal, industrial, food and beverage, mining, construction, brackish groundwater aquifers, or other waste source. In some embodiments, the method further comprises the step (e) of collecting the waste water for recovery of the dissociated ions. Such collection may be useful, for example, to reclaim valuable metallic species from various mining or industrial processes. Valuable metallic species may include, by non-limiting example, silver, gold, platinum, rhodium, ruthenium, indium, and the like.

The presently disclosed invention is useful for creating new affordable water sources by desalination of low salinity sources such as brackish ground and surface waters, and for water reuse and recycling (such as from municipal and industrial wastewater reclamation) by removing trace contaminants from polluted streams. Another application is for the removal of toxic, naturally occurring ionic contaminants, such as arsenic, boron, and fluoride, from ground water supplies.

The invention having been described, the following examples are offered to illustrate the subject invention by way of illustration, not by way of limitation.

EXAMPLES

Example 1

Figure 3:
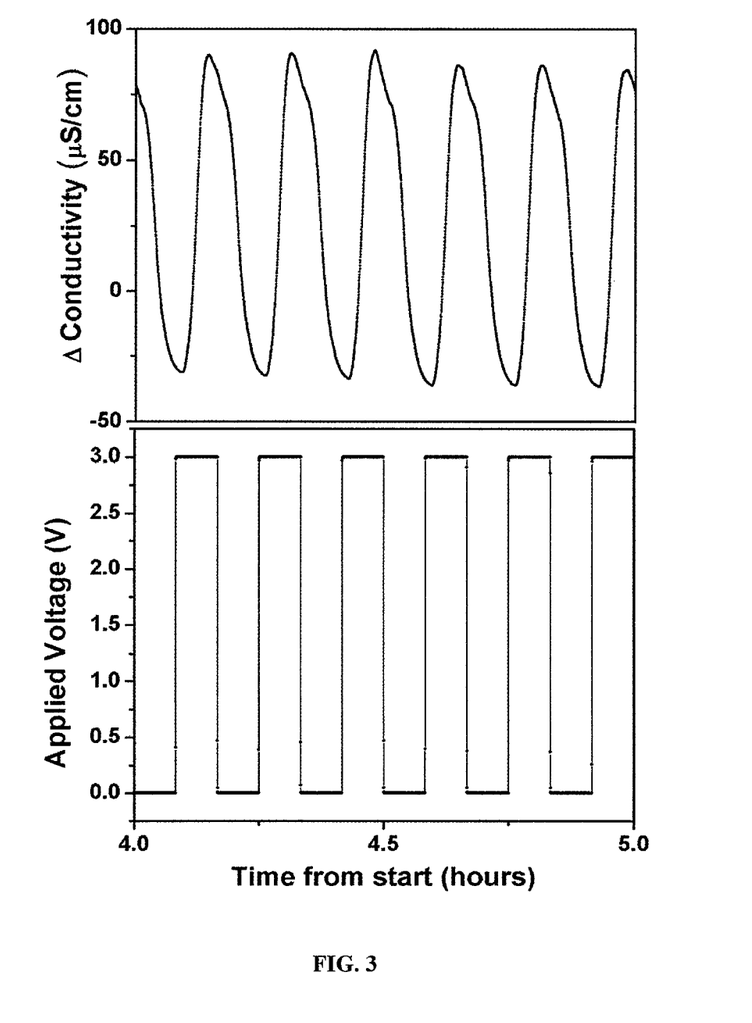
FIG. 3 is a graph demonstrating that desalination occurs in an embodiment of the device of the present disclosure without an applied voltage, followed by regeneration with an applied voltage.

The technology described herein was tested by developing IER-based conductive composite electrodes based on methods used in Li-ion batteries. CER based composite was used as the anode while AER based composite was the cathode. A solution of NaCl was flowed between the electrodes without an applied voltage. The Na$^+$ ions are captured by the CER in the anode while the ions are captured by the AER in the cathode. Upon saturation of the electrodes, an external applied voltage is used to regenerate the electrodes and release the captured Na$^+$ and ions. Once the salt is released and the electrodes are regenerated, the process of desalination repeats. FIG. 3 demonstrates the repeatable desalination-regeneration cycles with 0V for desalination and 3V for regeneration steps.

Example 2

Figure 4:
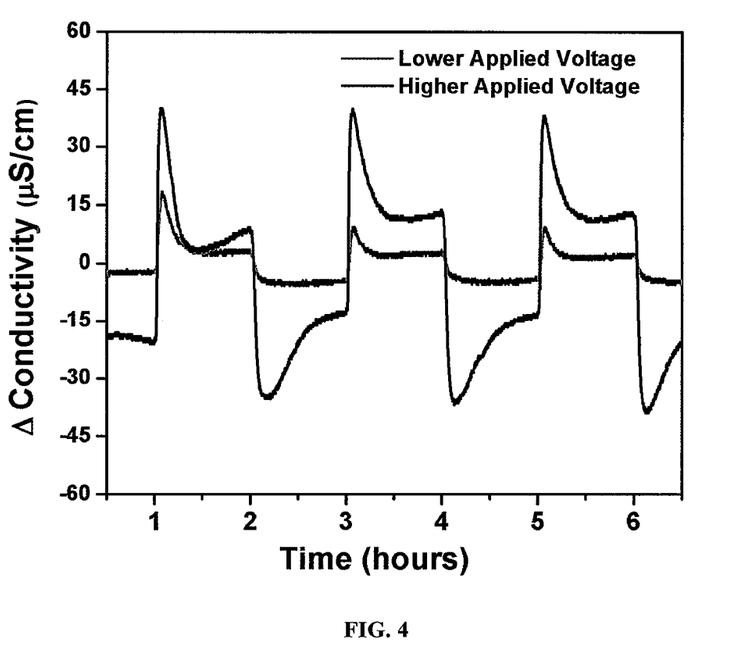
FIG. 4 is a graph demonstrating feasibility of system operation in an embodiment of the present disclosure under a range of applied voltages.

The technology can be operated under varying applied voltages during the regeneration step. In certain cases using a minimal applied voltage even during the desalination step may be favorable for enhancing the ion diffusion rates. The ability to operate the system under varying applied voltages allows for optimizing the energy consumption of the system. The applied voltage has a clear effect on the ion removal capacity of the system as shown in FIG. 4. The higher the applied voltage, the higher the salt removal capacity. However, beyond a certain voltage, undesirable secondary reactions at the electrode surface are a concern.

Example 3

Figure 5:
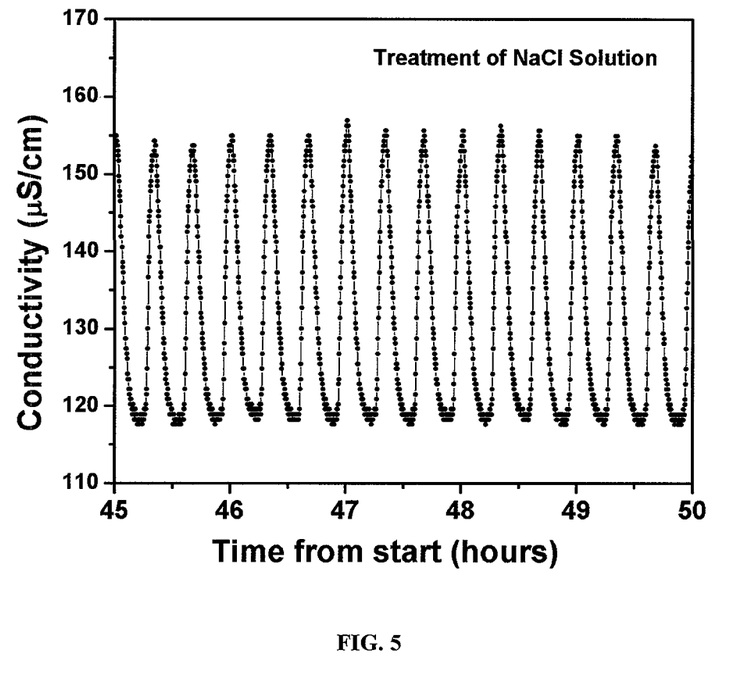
FIG. 5 is a graph demonstrating robustness of the electrodes in an embodiment of the present disclosure under continuous operation.

Upon careful optimization of the electrode composition, mechanical properties, and the operating conditions of the system, the technology shows reliable salt removal even upon continuous cycling of the system, as shown in FIG. 5. These results were obtained using generic CER and AER in the electrode composites.

Example 4

Figure 6A:
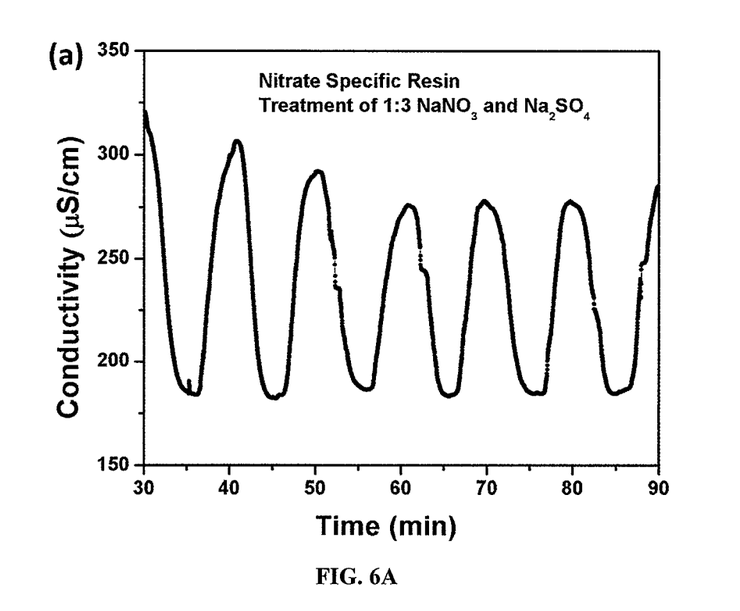
FIGS. 6A and 6B are graphs demonstrating (A) feasibility of approach using specialty resin, and (B) targeted ion removal from a mixed ion solution.
Figure 6B:
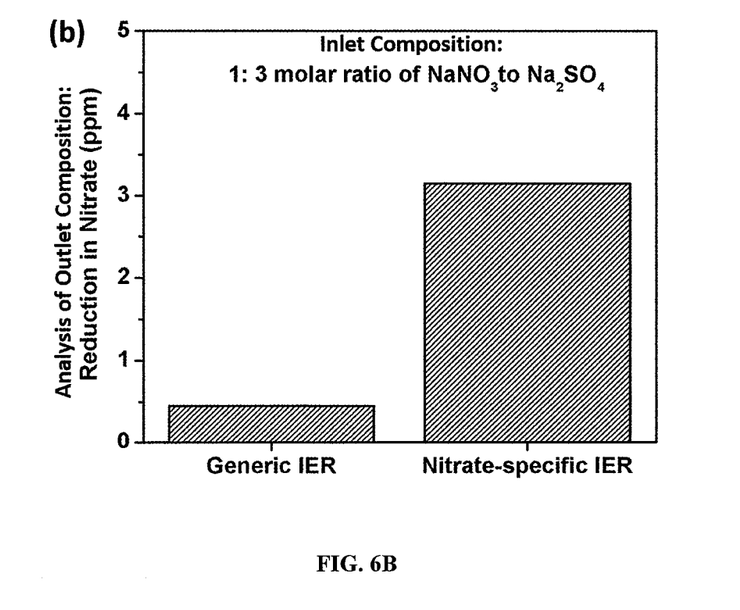

By using specialty IER in the electrode, a specific ion can be targeted and removed from a solution containing mixture of ions. For example, nitrate and sulfate ions co-exist in the environment. While consuming nitrate contaminated water is harmful to human health, sulfates are not a concern. Being able to target and remove nitrates over sulfates from a water source has clear applications. There exist commercially available nitrate-specific resins which selectively capture nitrates over sulfates, however they require regular regeneration using corrosive chemicals. We tested the ability of the presently disclosed apparatus and methods to selectively remove nitrates from an influent solution of 1:3 molar ratio of $NaNO_3$ and $Na_2SO_4$. Nitrate is an anion, so experiments were conducted using generic AER vs. generic CER and nitrate-specific AER vs. generic CER. FIG. 6A demonstrates the feasibility of the approach to use specialty resins. The ability to specifically remove nitrates over sulfates using specialty resins when incorporated into our technology is shown in FIG. 6B. This demonstrates a chemical-free approach to regenerating and using specialty resins for selective ion capture. This method can be extended to a variety of other ions for decontamination and resource recovery applications.

While the present invention has been described with reference to the specific embodiments thereof, it should be understood by those skilled in the art that various changes may be made and equivalents may be substituted without departing from the true spirit and scope of the invention. In addition, many modifications may be made to adapt a particular situation, material, composition of matter, process, process step or steps, to the objective, spirit and scope of the present invention. All such modifications are intended to be within the scope of the claims appended hereto. All of the various embodiments, aspects, and options disclosed herein can be combined in all variations. The scope of the methods and processes described herein include all actual or potential combinations of embodiments, aspects, options, examples, and preferences herein. All patents and publications cited herein are incorporated by reference herein for the specific teachings thereof as noted, unless other specific statements of incorporation are specifically provided.

What is claimed is:

1. A method of selectively removing at least a portion of dissolved ions from water containing a first concentration of ions to be removed, the method comprising:
    (a) providing a system for selectively removing at least a portion of the dissolved ions to be removed from an ion-containing water, the system comprising at least one first electrode in contact with a first plurality of selective ion exchange resin (IER) particles, at least one second electrode in contact with a second plurality of IER particles, an alternating or direct current voltage source, a chamber containing or defined by the at least one first electrode and the at least one second electrode, an inlet, and a first outlet, wherein the at least one first electrode, the at least one second electrode, and the direct (DC) or alternating (AC) current voltage source are in electrical communication with each other and the chamber is in fluid communication with the inlet and the first outlet, wherein the voltage source is configured so that the direction of a current to the at least one first electrode and the at least one second electrode can be switched; and wherein the first and second plurality of IER particles independently have selectivity for one or more ions to be removed;
    (b) providing a flow of water containing the first concentration of ions, said flow moving from the inlet into the chamber and out of the first outlet, wherein, in the chamber, one or more dissolved ions to be removed associate to the first and/or second plurality of selective IER particles, wherein water containing a second concentration of one or more of said dissolved ions to be removed flows out of the chamber via the first outlet, and wherein said second concentration of ions is lower than said first concentration of ions;

(c) passing an AC or DC current through a water remaining in the chamber, such that the one or more ions associated with the first and/or second plurality of selective IER particles dissociate from said particles, thereby forming in the chamber a waste water in which a second concentration of ions of the waste water is higher than said first concentration of ions; and (d) flowing the waste water out of the chamber.

2. The method of claim 1, further comprising, in step (b), passing a direct or alternating current through the water in the chamber containing the first concentration of ions to be removed via the at least one first electrode and at least one second electrode.

3. The method of claim 2, wherein the current is direct current, the at least one first electrode is negatively charged, and the at least one second electrode is positively charged.

4. The method of claim 2 wherein the current is an alternating current.

5. The method of claim 2, wherein the absolute magnitude of applied voltage across the at least one first electrode and the at least one second electrode is from about 0 to about 5 volts.

6. The method of claim 5, wherein the current across the at least one first electrode and the at least one second electrode is from about 10 $\mu A/cm^2$ to about 10 $mA/cm^2$.

7. The method of claim 1, further comprising repeating steps (c) and (d) one or more times.

8. The method of claim 1, wherein the device further comprises a second outlet in fluid communication with the chamber, the inlet and the first outlet.

9. The method of claim 8, wherein the waste water is flowed out of the second outlet.

10. The method of claim 1, further comprising reducing, increasing or stopping the flow of water of step (b) during step (c).

11. The method of claim 1, wherein the ions to be selectively removed are anions and/or cations comprising one or more elements from any one or more of Periodic Table Groups 1 to 17.

12. The method of claim 11, wherein at least one of the anions or cations comprise an element of Group 1 or 2.

13. The method of claim 12, wherein the cations to be selectively removed are one or more of lithium, sodium, potassium, or calcium.

14. The method of claim 11, wherein at least one of the anions or cations comprise one or more elements from any one or more of Groups 3-14.

15. The method of claim 14, wherein at least one of the anions or cations comprise one or more elements selected from the group consisting of sodium, potassium, lithium, calcium, fluorine, chlorine, bromine, antimony, arsenic, bismuth, boron, cadmium, chromium, copper, gallium germanium, gold, indium, iridium, iron, lead, manganese, mercury, nickel, nitrogen, phosphorous, platinum, radium, rhodium, ruthenium, selenium, silver, sulfur, thallium, tin, uranium, and zinc.

16. The method of claim 14, wherein the anions to be selectively removed are one or more of arsenate, fluoride, bromate, chloride, chromate, cyanide, nitrate, perchlorate, phosphate, selenate, or sulfate.

17. The method of claim 1, wherein the first plurality of selective ion exchange resin particles and the second plurality of selective ion exchange resin particles are each independently selected from the group consisting of strongly acidic resins bearing sulfonic acid groups, strongly basic resins bearing quaternary amino groups, weakly acidic resins with carboxylic acid groups, weakly basic resins bearing primary, secondary, and/or tertiary amino groups, chelating resins bearing iminodiacetic acid groups, ion selective resins, gel-type resins and macroporous resins.

18. The method of claim 17, wherein the first plurality of selective ion exchange resin particles and the second plurality of selective ion exchange resin particles are different.

19. The method of claim 1, wherein the at least one first electrode and the at least one second electrode comprise a conductive substrate.

20. The method of claim 19, wherein the conductive substrate is one or more of a conductive metal, a conductive metal alloy, or a conductive polymer.

21. The method of claim 20, wherein the conductive metal is stainless steel.

22. The method of claim 20, wherein the conductive substrate is comprised of carbon.

23. The method of claim 20, wherein the conductive polymer is a nylon composite plate, mesh or film.

24. The method of claim 1, wherein the ion-containing water contains ions in an amount from about 1 ppm to about 10,000 ppm.

25. The method of claim 1, wherein the first concentration of ions to be removed is from about 1 ppm to about 10,000 ppm.

26. The method of claim 1, wherein the second concentration of ions of the waste water is from about 0.01 ppm to about 4,000 ppm.

27. The method of claim 1, wherein the dissolved ions comprise at least a first species of ion and a second species of ion, and wherein selective removal of the first species of ion in the presence of the second species of ion occurs with a selectivity for the first species of ion of from about 5 to about 200 fold.

28. The method of claim 27, wherein the first species of ion is nitrate and the second species of ion is sulfate.

29. The method of claim 1, wherein the current across the at least one first electrode and the at least one second electrode in step (c) is applied at an absolute magnitude of voltage of from about 0.1 to about 5 volts.

30. The method of claim 1, wherein the absolute magnitude of current across the at least one first electrode and the at least one second electrode in step (c) is from about 10 $\mu A/cm^2$ to about 10 $mA/cm^2$.

31. The method f claim 1, wherein the current is applied for a time sufficient to detach from about 20% to about 95% of the ions associated with IER particles.

32. The method claim 31, wherein the time is from about 1 second to about 2 hours.

33. The method of claim 1, further comprising the step (e) of collecting the waste water for recovery of the dissociated ions.

34. The method of claim 1, wherein the ion-containing water is provided from an agricultural, municipal, industrial, food and beverage, mining, construction, brackish groundwater aquifer, or other waste source.

35. The method of claim 1, wherein the system comprises at least two or more first electrodes and at least two or more second electrodes.

* * * * *